United States Patent [19]
Rice

[11] Patent Number: 5,934,008
[45] Date of Patent: Aug. 10, 1999

[54] FISHING LURE

[76] Inventor: Mont Rice, 2289 Viking Mt. Rd., Greenville, Tenn. 37743

[21] Appl. No.: 08/903,339

[22] Filed: Aug. 1, 1997

[51] Int. Cl.$^6$ .................................................. A01K 85/00
[52] U.S. Cl. ...................... 43/42.26; 43/42.24; 43/42.27
[58] Field of Search ................. 43/42.1, 42.24, 43/42.26, 42.27, 42.28, 42.29; D22/127, 128

[56] References Cited

U.S. PATENT DOCUMENTS

| | | | |
|---|---|---|---|
| 208,581 | 10/1878 | Falvey | 43/42.26 |
| D. 222,585 | 11/1971 | Smithwick | D22/127 |
| D. 231,453 | 4/1974 | Haggard | D22/132 |
| D. 239,447 | 4/1976 | Radcliff | D22/127 |
| 1,247,955 | 11/1917 | Grube | 43/42.26 |
| 1,267,627 | 5/1918 | Campbell | 43/42 |
| 1,813,722 | 7/1931 | Wright et al. | 43/42.26 |
| 2,218,280 | 10/1940 | Deering | 43/42.26 |
| 2,290,433 | 7/1942 | Jeffers | 43/42 |
| 2,503,672 | 4/1950 | Johnson et al. | 43/42 |
| 2,633,660 | 4/1953 | Ray | 43/42.27 |
| 2,718,668 | 9/1955 | Burke | 43/42.24 |
| 2,793,460 | 5/1957 | Mutchler | 43/42.26 |
| 3,120,074 | 2/1964 | Messler | 43/35 |
| 3,377,734 | 4/1968 | Snow | 43/42.24 |
| 3,389,490 | 6/1968 | Peters et al. | 43/42.1 |
| 4,186,510 | 2/1980 | Kimerer, Jr. | 43/42.25 |
| 4,214,396 | 7/1980 | Firmin | 43/42.24 |
| 4,219,956 | 9/1980 | Hedman | 43/42.1 |
| 4,312,148 | 1/1982 | Hardwicke, III | 43/42.24 |
| 4,592,161 | 6/1986 | Smith et al. | 43/42.24 |
| 4,619,069 | 10/1986 | Strickland | 43/42.26 |
| 4,653,212 | 3/1987 | Pixton | 43/4.5 |
| 4,709,501 | 12/1987 | Garst | 43/42.24 |
| 4,858,367 | 8/1989 | Rabideau | 43/42.25 |
| 4,914,850 | 4/1990 | Rice | 43/42.24 |
| 5,428,918 | 7/1995 | Garrison | 43/42.28 |
| 5,465,523 | 11/1995 | Garst | 43/42.24 |
| 5,787,634 | 8/1998 | Way | 43/42.15 |

*Primary Examiner*—Michael J. Carone
*Assistant Examiner*—Darren Ark
*Attorney, Agent, or Firm*—Luedeka, Neely & Graham, P.C.

[57] ABSTRACT

A fishing lure body for being impaled on a hook is provided. The lure body includes a cylindrical head portion adjacent an articulated tail portion. The head portion includes a plurality of resilient appendages, including appendages for imitating legs or wings and appendages for imitating antennae. The articulated tail portion includes several hemispherically shaped segments joined one to the other, forming an upper curved surface and a lower flat surface. The lure body may be impaled onto the hook and presented in such a manner that the lure body resembles an insect. In another manner of impalement and presentment, the lure body resembles a crayfish.

7 Claims, 4 Drawing Sheets

FISHING LURE

TECHNICAL FIELD

The present invention relates generally to fishing lures, and particularly to a lure having a resilient body with appendages for imitating both aquatic and non-aquatic creatures.

BACKGROUND

As any seasoned angler knows, lure selection is one of the most important decisions the angler will make in pursuit of a quality fish. At times, a lure which imitates a particular species of bait fish will produce strikes. Fish such as bass and walleye will sometimes eschew bait fish in favor of other aquatic creatures such as crayfish. At other times fish will prefer to obtain sustenance from non-aquatic creatures such as flies (as usually occurs during major hatchings of certain fly species). Thus, at any given time an angler must resolve, in one way or another, to present fish with a lure that imitates the particular type of bait that fish are seeking.

Typically, an angler will try several different types of lures before settling on one that produces acceptable results. Since many lures are designed to imitate only one type of bait, finding an acceptable lure requires that the angler repeatedly test and replace lures until finding one that works. Thus, in finding an acceptable lure, an angler will typically cut and tie several lures onto the fishing line in hopes of eventually finding a lure which produces quality fish. Such an angling ritual is frustrating and it wastes time as well as fishing line each time a lure is changed.

Therefore, there is need for a lure which is capable of imitating a plurality of bait species so that anglers need not change lures in order to present a different imitation of bait to the fish, but instead, can simply vary the method by which a single lure is presented to enhance fishing success.

SUMMARY

The present invention addresses the need for a highly versatile lure by providing a fishing lure which can be impaled on a hook to imitate a variety of bait species. The lure includes an elongated, resilient body member having a head portion and a tail portion. The head portion is substantially cylindrical with first and second opposite ends. A first plurality of resilient appendages projects laterally along the head portion between the first and second ends. A second plurality of resilient appendages positioned at substantially degrees from the first plurality of resilient appendages also projects laterally along the head portion between the first and second ends. The tail portion extends rearwardly from the second end of the head portion. The tail portion includes a plurality of substantially hemispherical tail segments, forming a curved upper surface and a substantially flat lower surface.

The lure may include various other features. For example, a third plurality of resilient appendages may extend forwardly from the first end of the head portion. Also, the appendages of the first plurality of resilient appendages may be of varying length. Likewise, the appendages of the second plurality of resilient appendages may be of varying length. Additionally, the first and second plurality of appendages may be symmetrical to each other.

BRIEF DESCRIPTION OF THE DRAWINGS

The above and other aspects of the invention will now be described in the following detailed specification considered in conjunction with the accompanying drawings in which.

DETAILED DESCRIPTION OF PREFERRED EMBODIMENTS

Figure 1:
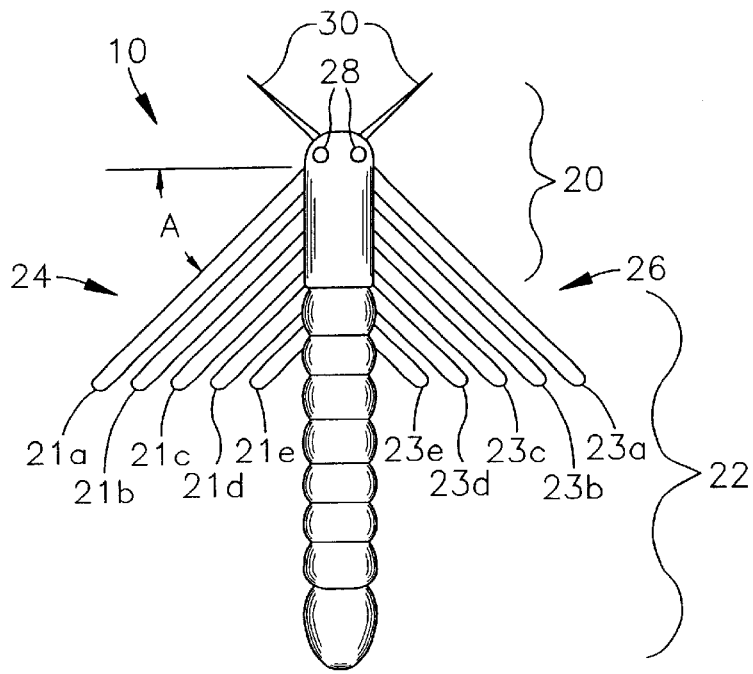
FIG. 1 is a top view of a lure body according to a preferred embodiment of the invention.
Figure 2:
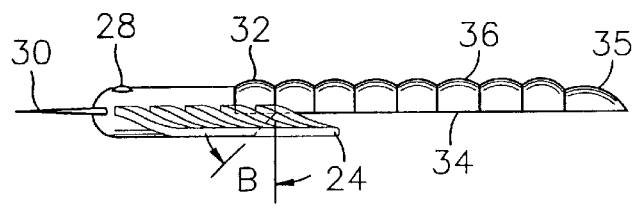
FIG. 2 is a side view of the lure body of FIG. 1.
Figure 3:
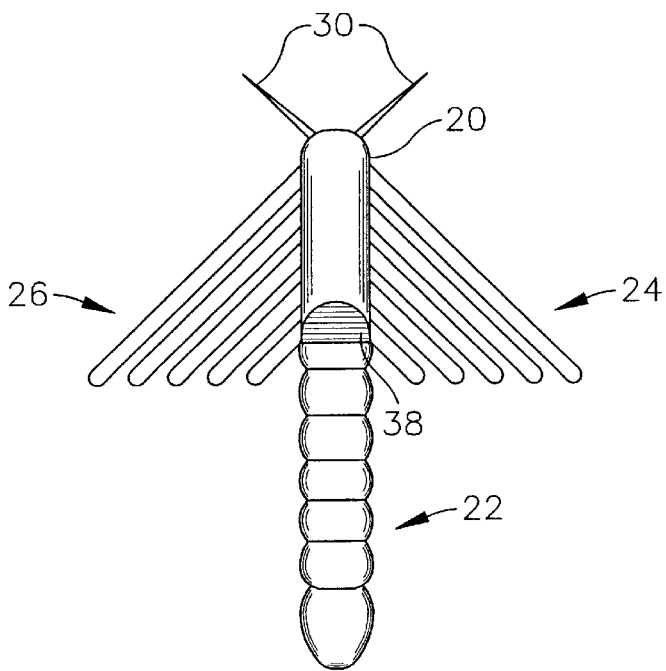
FIG. 3 is a bottom view of the lure body of FIG. 1.

With reference now to the drawings in which like reference characters designate like or similar parts throughout the several views, FIGS. 1–3 show a fishing lure body 10 in accordance with the invention which may be fabricated from a resilient material, such as soft plastic, in a variety of colors, or cast in a unitary construction using conventional or hereinafter developed molding techniques known to those of ordinary skill.

The lure body 10 includes an elongate head portion 20 and an elongate tail portion 22. The head portion 20 is preferably substantially cylindrical in shape with a rounded or bulbous forward section. The head portion 20 includes two symmetrical sets or rows of flexible, elongate appendages 24, 26 projecting laterally from opposite sides spaced apart about 180°.

To reduce tangling and enhance the lure's attraction, the appendages within each row 24, 26 are preferably of descending length moving from the head portion 20 to the tail portion 22, although two or more of the appendages within each row 24, 26 can be substantially the same length. Each appendage within a row 24, 26 also preferably projects from the body 10 at an angle A with respect to the longitudinal axis of the body which is preferably about 45 degrees. The appendages, are preferably configured to resemble, to a substantial degree, both legs and wing-type structures. That is, the collective appearance of the appendages will resemble both legs and wings, or both, which enhances the attractiveness of the lure to a wider range of fish and fish hunting for different types of bait.

The rounded end of the head 20 may be provided with a pair of protrusion, or recesses simulating eyes 28 and a pair of secondary appendages 30 projecting forwardly of the head portion 20 for imitating bait features such as antennae.

The tail portion 22 extends from the rearward end of the head portion 20 and includes a series of semi-rounded or semi-bulbous segments 32 terminated with a terminal tail segment 35, all of which enhance the lure's visual appeal to fish. Aesthetically, the segmented tail section 22 is intended to imitate the segmented tails of creatures such as flying insects and crayfish. Functionally, segmenting the tail portion 22 increases the lure's flexibility to give the lure body 10 a more lifelike movement as it is presented to fish. Each segment 32 includes a rounded upper surface and a substantially flat lower surface 34. Thus, each segment 32 can be viewed as being a semi-hemispherical bulbous band so that when the segments are joined, an articulated upper surface 36 is formed in conjunction with the flat lower surface 34. The cross-sectional area of the head portion 20 (being substantially circular) is therefore substantially greater than the cross-sectional area of the tail portion 22 (being substantially semicircular).

At the interface of the head and tail portions there is provided a ramp or transition surface 38. Surface 38 is preferably positioned at an angle B of about 45 degrees from normal to the bottom surface 34 of the tail portion 22. Surface 38 functions to provide enhanced structural support and strength at the head-tail transition as well as laminar flow characteristics as the lure 10 is retrieved through the water.

Figure 4:
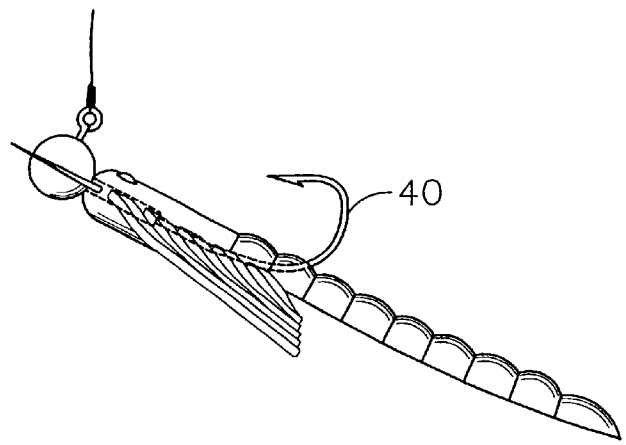
FIG. 4 is a perspective view of the lure body of FIG. 1 rigged with a weighted hook to imitate an insect.

It is a feature of the invention that the particular type of bait imitated by the lure 10 may be controlled by the manner in which the angler rigs, presents and retrieves the lure 10. For example, FIG. 4 illustrates how the lure 10 can be rigged with a weighted hook 40 through the head portion 20 to imitate a flying insect. The lure 10 may then be presented, for example, in a vertical jigging manner or by fast retrieve.

Figure 5:
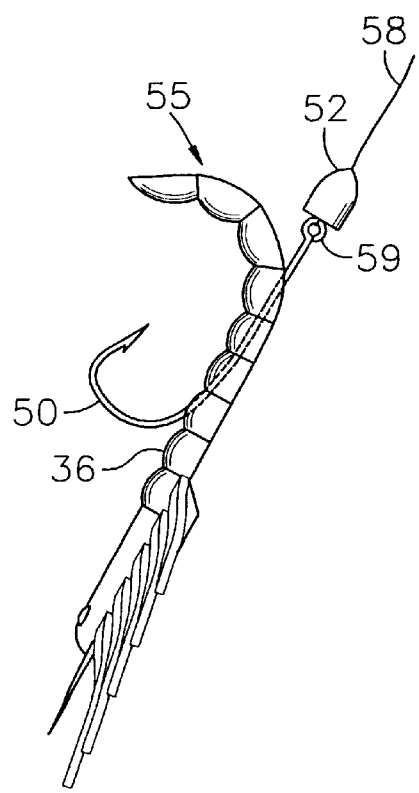
FIG. 5 is a side view of the lure body of FIG. 1 rigged from the lure bottom with a non-weighted hook to imitate a crayfish.
Figure 6:
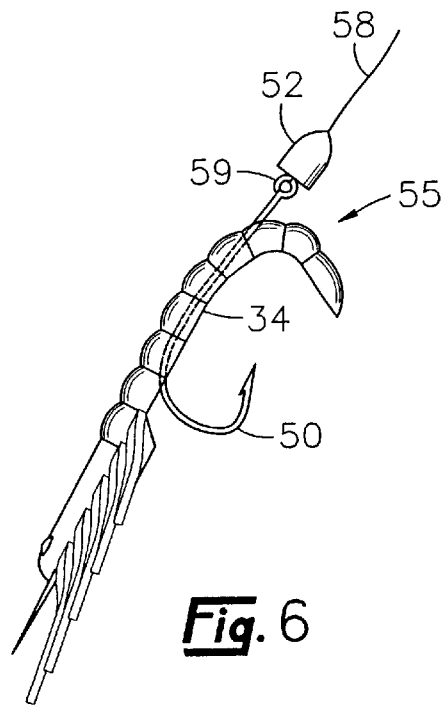
FIG. 6 is a side view of the lure body of FIG. 1 rigged from the lure top with a non-weighted hook to imitate a crayfish.
Figure 7:
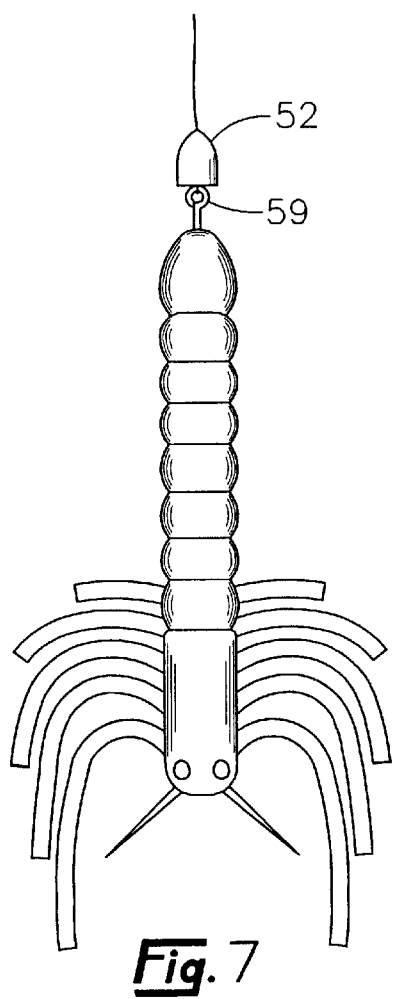
FIG. 7 is a top view of the rigged lure shown in FIG. 6.

FIGS. 5–7 illustrate methods for rigging the lure 10 to imitate the natural action of a crayfish wherein a straight shank, non-weighted hook 50 is impaled through the tail portion 22. The hook 50 can be impaled in such a manner that the point of the hook 50 is positioned adjacent the curved surface 36 (FIG. 5) or such that the point is adjacent flat surface 34. In either case, it is preferable that the hook 50 penetrate only the middle section of the tail portion 22 as shown so that at least part of the tail portion, indicated generally at 55, is free to flex as the lure 10 is retrieved.

When a non-weighted hook 50 is used, it is preferable to augment the buoyancy of the hook 50 and lure 10 combination by including a slip weight 52 which is slidingly attached to the fishing line 58 above the hook eyelet 59. The lure 10 is allowed to sink to the bottom of the waterway or to an intermediate depth for suspended fish. The lure 10 can be retrieved, for example, by imparting a series of jerks or twitches to the rod to force the lure 10 to rise and sink in an erratic manner to simulate the natural swimming motion of a crayfish. It has been found that a particularly productive technique is to impart a series of about 3 or 4 jerks, pause, and start again.

A lure 10 in accordance with the present invention can be made of varying sizes and dimensions. In a preferred embodiment, the overall length of the lure 10 is about 3 inches, the head portion 20 is about ⅞ inches long with a diameter of about 5/32 inches, the tail portion 22 is about 2 inches long, the radius of each or most tail portion segments 32 is about ¼ inch (actual radius may vary from segment to segment), and the length of the terminal tail segment 35 is about ½ inch. The length of appendages 24, 26 from longest to shortest are about 1⅝ inches, 1⅜ inches, 1 inch, ¾ inches, and ⅜ inches. The width of each appendage is about 3/16 inches and the spacing between appendages is about ⅛ inches.

Figure 8:
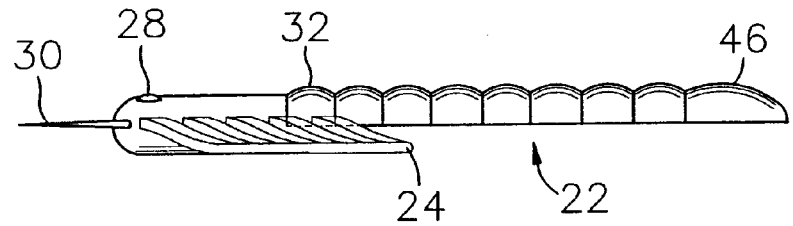
FIG. 8 is a side view of a lure body with enlarged terminal tail segment for use with a weighted shank hook.
Figure 9:
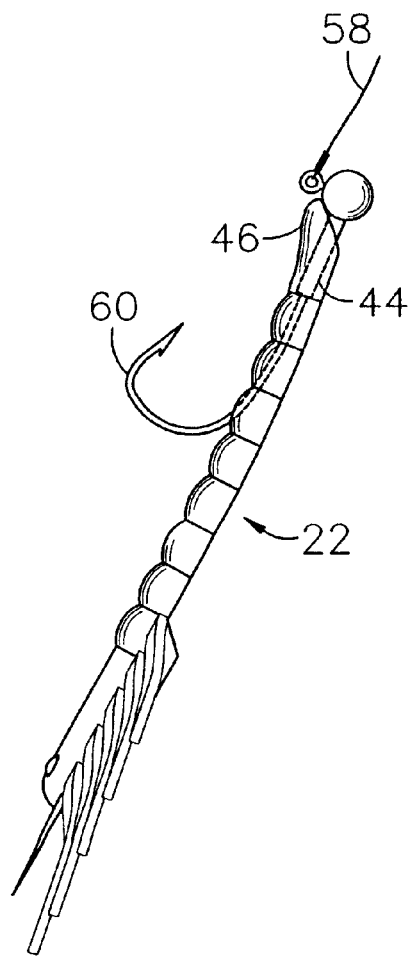
FIG. 9 is a side view of the lure body of FIG. 8 with a weighted shank hook inserted through the enlarged terminal tail segment.

An alternate embodiment of a lure 10 in accordance with the present invention is shown in FIGS. 8 and 9. In this alternate embodiment, a weighted shank hook 60 is impaled through the tail portion 22 so that the lure 10 imitates the natural swimming motion of a crayfish or other aquatic creature. The weighted shank 44 is larger in diameter a typical hook shank and imparts a significant amount of deformation to the terminal tail segment 46 when the hook 60 is impaled in the manner shown in FIG. 9. To accommodate the larger diameter of the weighted shank 44 and reduce the likelihood that the weighted shank 44 will tear or otherwise damage the lure 10, the terminal tail segment 46 is elongated and thickened. In a preferred embodiment, the length of the terminal tail segment 46 is about ⅝ inch.

Having now described various features and aspects of an embodiment of the invention, it will be apparent to those skilled in the art that numerous modifications and/or changes may be made in the embodiments of the invention within the scope and spirit of the appended claims.

What is claimed is:

1. A fishing lure body which comprises:

an elongate, resilient, substantially cylindrical head portion having first and second ends and a planar array of first and second groups of spaced-apart, laterally projecting, resilient appendages located on generally opposite sides of the head portion; and an elongate, resilient tail portion extending from the second end of said head portion and forming a transition between the head and tail portions, said tail portion including a plurality of substantially semi-hemispherical bulbous tail segments forming a segmented, curved upper surface and a substantially flat lower surface;

wherein each of said resilient appendages includes an attachment end attached to the head portion in opposed relation to a terminal end, wherein the terminal ends of the resilient appendages lie along a line substantially perpendicular to the lure body.

2. The lure body of claim 1, further comprising a third group of resilient appendages extending forwardly from the first end of said head portion.

3. The lure body of claim 1 wherein said first and second groups of appendages are symmetrical to each other.

4. The lure body of claim 1 wherein each appendage within said first group of appendages has a length that is different from all other appendages within the first group of appendages.

5. The lure body of claim 1 wherein each appendage within said second group of appendages has a length that is different from all other appendages within the second group of appendages.

6. The lure body of claim 1 wherein the transition between the head and tail portions is defined by a generally straight line which extends transversely across the lower flat surface of said tail portion.

7. The lure body of claim 6 wherein the cross-sectional area of said head portion forward of said line is substantially greater than the cross-sectional area of said tail portion.

* * * * *